US011430259B2

(12) United States Patent
Chen et al.

(10) Patent No.: US 11,430,259 B2
(45) Date of Patent: Aug. 30, 2022

(54) OBJECT DETECTION BASED ON JOINT FEATURE EXTRACTION

(71) Applicant: Microsoft Technology Licensing, LLC, Redmond, WA (US)

(72) Inventors: Dong Chen, Beijing (CN); Fang Wen, Beijing (CN); Gang Hua, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 145 days.

(21) Appl. No.: 16/584,769

(22) Filed: Sep. 26, 2019

(65) Prior Publication Data

US 2020/0026907 A1 Jan. 23, 2020

Related U.S. Application Data

(63) Continuation of application No. 15/261,761, filed on Sep. 9, 2016, now Pat. No. 10,467,459.

(51) Int. Cl.
*G06V 40/16* (2022.01)
*G06K 9/62* (2022.01)
*G06V 10/44* (2022.01)

(52) U.S. Cl.
CPC .......... *G06V 40/171* (2022.01); *G06K 9/6271* (2013.01); *G06V 10/454* (2022.01);
(Continued)

(58) Field of Classification Search
CPC ........... G06K 9/00288; G06K 9/00281; G06K 9/00228; G06K 9/00248; G06K 9/00268; G06K 9/00295; G06K 9/00308; G06K 9/00523; G06T 2207/30201; G06T 2207/30196; G06V 40/172; G06V 40/161; G06V 40/168; G06V 40/174;
(Continued)

(56) References Cited

U.S. PATENT DOCUMENTS 10,467,459 B2 * 11/2019 Chen .................. G06K 9/00281
2002/0038294 A1 * 3/2002 Matsugu ................ G06N 3/063
706/20

(Continued)

OTHER PUBLICATIONS

Mauthner et al., Encoding based saliency detection for videos and images, Jun. 7-12, 2015 [retrieved Apr. 15, 2021], 2015 IEEE Conference on Computer Vision and Pattern Recognition, pp. 2494-2502. Retrieved: https://ieeexplore.ieee.org/abstract/document/7298864 (Year: 2015).*

(Continued)

*Primary Examiner* — Matthew C Bella
*Assistant Examiner* — Dennis Rosario

(57) ABSTRACT

In implementations of the subject matter described herein, a solution for object detection is proposed. First, a feature(s) is extracted from an image and used to identify a candidate object region in the image. Then another feature(s) is extracted from the identified candidate object region. Based on the features extracted in these two stages, a target object region in the image and a confidence for the target object region are determined. In this way, the features that characterize the image from the whole scale and a local scale are both taken into consideration in object recognition, thereby improving accuracy of the object detection.

20 Claims, 4 Drawing Sheets

(52) U.S. Cl.
CPC .......... *G06V 40/161* (2022.01); *G06V 40/165* (2022.01); *G06V 40/168* (2022.01)

(58) Field of Classification Search
CPC .... G06V 40/165; G06V 10/82; G06V 40/171; G06V 40/107; G06V 40/178; G06V 40/16; H04N 5/23219
See application file for complete search history.

(56) References Cited

U.S. PATENT DOCUMENTS

2017/0147905 A1* 5/2017 Huang ................. G06K 9/6232
2017/0339417 A1* 11/2017 Puri ..................... G06K 9/4652

OTHER PUBLICATIONS

Erhan et al., Scalable Object Detection Using Deep Neural Networks, Jun. 23-28, 2014 [retrieved Apr. 15, 2021], 2014 IEEE Conference on Computer Vision and Pattern Recognition, pp. 2155-2162. Retrieved: https://ieeexplore.ieee.org/abstract/document/6909673 (Year: 2014).*

Szegedy et al., Deep Neural Networks for Object Detection, Jan. 2013 [retrieved Apr. 15, 2021], Conference: Advances in Neural Information Processing Systems, 10 pages. Retrieved: https://www.researchgate.net/publication/319770289_Deep_Neural_Networks_for_Object_Detection (Year: 2013).*

Wan et al., End-to-End Integration of a Convolutional Network, Deformable Parts Model and Non-Maximum Suppression, Jun. 7-12, 2015 [retrieved Oct. 8, 2021], 2015 IEEE Conference on Computer Vision and Pattern Recognition, pp. 851-859. Retrieved: https://ieeexplore.ieee.org/abstract/document/7298686 (Year: 2015).*

Yim et al., Rotating Your Face Using Multi-task Deep Neural Network, Jun. 7-12, 2015 [retrieved Apr. 21, 2022], 2015 IEEE Conference on Computer Vision and Pattern Recognition, pp. 676-684. Retrieved: https://ieeexplore.ieee.org/abstract/document/7298667 (Year: 2015).*

Ouyang et al., DeepID-Net: Deformable Deep Convolutional Neural Networks for Object Detection, Jun. 7-12, 2015 [retrieved Apr. 21, 2022], 2015 IEEE Conference on Computer Vision and Pattern Recognition, pp. 2403-2412. Retrieved: https://ieeexplore.ieee.org/abstract/document/7298854 (Year: 2015).*

Asthana et al., Fully Automatic Pose-Invariant Face Recognition via 3D Pose Normalization, Nov. 6-13, 2011 [retrieved Apr. 21, 2022], 2011 International Conference on Computer Vision, pp. 937-944. Retrieved: https://ieeexplore.ieee.org/abstract/document/6126336 (Year: 2011).*

* cited by examiner

OBJECT DETECTION BASED ON JOINT FEATURE EXTRACTION

CROSS-REFERENCE TO RELATED APPLICATION

This application is a continuation of U.S. patent application Ser. No. 15/261,761, filed Sep. 9, 2016, the content of which is hereby expressly incorporated herein by reference in its entirety.

BACKGROUND

Object detection techniques are used to locate, identify, or verify one or more specific objects in images. For example, automatic face detection has a variety of useful applications in security systems, face tracking systems, photo editing systems, and so on. Although various efforts have been undertaken, face detection remains to be a challenging task because of the variances in images of face pose, facial expression, background, view, illumination, and skin color. Such variations cause the face data distribution to be highly nonlinear and complex. Moreover, in applications such as real life face detection, the camera limitations and pose variations make the distribution of faces in feature space dispersed and complicated. As a result, the robustness of conventional face detection is now relatively low. Detection of other objects suffer from similar deficiencies.

SUMMARY

In accordance with implementations of the subject matter described herein, a solution for object detection is proposed. First, a feature(s) is extracted from an image and used to identify a candidate object region in the image. Then another feature(s) is extracted from the identified candidate object region. Based on the features extracted in these two stages, a target object region in the image and a confidence for the target object region are determined. In this way, the features that characterize the image from the whole scale and a local scale are both taken into consideration in object recognition, thereby improving accuracy of the object detection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below. A definition of a term is consistent throughout the description unless the context clearly indicates otherwise.

The inventors have found that joint features extracted from different spatial resolutions or scales of an image may improve accuracy of the object detection. The inventors have also found that directly combining several processes to detect given objects in different scales of an image will significantly increase the computation complexity. Accordingly, in accordance with implementations of the subject matter described herein, the features are extracted in two stages.

In the first stage, a feature(s) is extracted from an image to characterize the image in a whole scale with information about "context" around object regions. Instead of extracting a feature from a different scale of the whole image, in the second stage of feature extraction, another feature(s) is extracted from a certain candidate object region that is identified in the image based on the feature extracted in the first stage. This feature may characterize the image in a local scale with information inside the candidate object region. Various feature extraction approaches such as convolutional neural networks (CNN) may be adopted in the respective stages to extract the features. The features extracted in both the two stages are used to jointly determine a target object region in the image and a confidence for the target object region.

For ease of discussions, in the following, example implementations of the subject matter described herein will be described in the context of detection of faces such as human faces. It is to be understood, however, principles as proposed herein also apply to detection of any other given objects in images.

Figure 1:
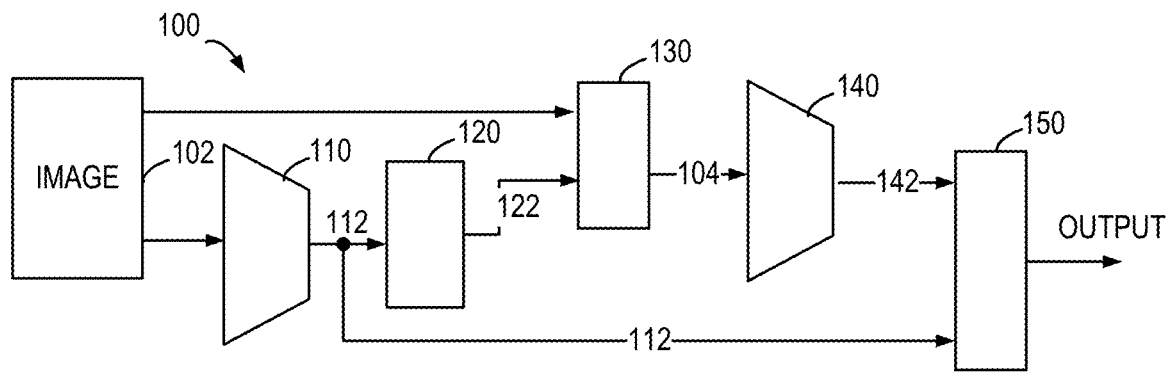
FIG. 1 illustrates a block diagram of a system for object detection in accordance with an implementation of the subject matter described herein.

FIG. 1 shows a block diagram of an example system 100 for object detection in accordance with an implementation of the subject matter described herein. As shown, in general the system 100 includes a first feature extraction stage 110, a candidate output stage 120, a region identification stage 130, a second feature extraction stage 140, and a final output stage 150.

The first feature extraction stage 110 receives or otherwise accesses an input image 102 and extract a first feature 112 from the image 102. The first feature 112 may be a low-dimension representation of the image 102 which characterizes the information contained in the image 102 with a number of values. In some implementations, depending on the size of the image 102 and the configuration of the first feature extraction stage 110, the first feature extraction stage 110 may extract from the image 102 a plurality of first features 112, each of which can be used to identify a candidate object region in the image 102.

The first feature(s) 112 is provided to the candidate output stage 120. The candidate output stage 120 determines, based on the received first feature 112, candidate information 122 for identification of a candidate object region in the image 102. The candidate information 122 may indicate a location of the candidate object region in the image 102. It would be appreciated that the candidate information 122 output by the candidate output stage 120 can be considered as a coarse object detection result with relatively low accuracy, which would be verified and/or adjusted in the following stages.

The region identification stage 130 receives the input image 102 and the candidate information 122 from the candidate output stage 120, and identifies a candidate object region 104 in the image 102 based on the received candidate information 122. In implementations where a plurality of first features 112 are extracted, a plurality of corresponding candidate object regions 104 may be identified in the image 102.

A candidate object region 104 is provided to the second feature extraction stage 140 which extracts a second feature 142 from the candidate object region 104. In some implementations, the second feature 142 may be a low-dimension representation of the candidate object region 104 that characterizes the information contained in the candidate object region 104. Compared with the first feature 112, the second feature 142 provides fine-grained details of rotation and scale variation inside the candidate object region 104.

Both the first and second features 112 and 142 are passed into the final output stage 150 which determines a target object region in the image 102 and a confidence for the target object region. By concatenating the first and second features 112 and 142 together, a final object detection output with improved accuracy is obtained.

Now some example implementations at various stages in the system 100 will be discussed with reference to FIG. 2 which shows a flowchart of a method 200 for object detection. The method 200 can be carried out by the system 100. Once again, although example implementations for face detection will be described, the method 200 can be carried out to detect any other specific objects in images.

At 210, one or more first features 112 are extracted from an image 102 at the first feature extraction stage 110. By way of example, in some implementations, a convolutional neural network (CNN) can be applied herein to extract the first feature. In these implementations, the first feature extraction stage 110 may be constructed as a CNN.

A CNN includes a plurality of layers such as convolutional layers, pooling layers, and/or inception layers to perform corresponding operations for feature extraction. Each layer includes a number of neurons connected with neurons of the previous and next layers. A layer of the CNN receives and processes an input (for example, the image 102 for the first layer) and provides an intermediate result to the next connected layer. The last layer of the CNN outputs the resulting features as the first features 112. Different layers in the CNN may be arranged in any manners and the number of the layers may be set based on the requirements of learning depth and computation capability. The CNN may be obtained from a training process with supervised information to obtain parameters for the neurons. The training of the CNN will be described below.

It is to be understood, however, that the CNN is just an example process which is capable of extracting features from the image, without suggesting any limitations as to the scope of the subject matter described herein. In addition to or instead of CNN, any other suitable technologies can be used to extract features from the image 102.

At 220, a candidate object region (for example, a candidate face region) 104 in the image 102 is identified based on the first feature 112. As mentioned above, extraction of the candidate information 122 is done at the candidate output stage 120.

In some implementations, the candidate information 122 includes a bounding box with predetermined size and/or shape. A bounding box may be represented by the locations of the corners thereof, for example. The image area within the bounding box is considered to be a potential face region 104.

Alternatively, or in addition, in order to help distinguish face regions from non-face ones, the candidate information 122 may include information that can be used for face alignment. For example, the candidate output stage 120 may determine positions of one or more facial landmarks based on the first feature 112, as a part of the candidate information 122. Examples of the facial landmarks may include, but are not limited to, eye corners, mouth corners, nose tip, and the like. The number of the positions may be set, for example, according to precision requirements, computation capability, and/or other relevant factors.

In some implementations, a plurality of neurons in a neural work may be used to learn and generate the candidate information 122 from the first feature 112. In such implementations, the candidate output stage 120 is constructed as an output layer for the CNN of the first feature extraction stage 110. In an example, the candidate output stage 120 can be constructed as a fully connected output layer with neurons connected to all the values in the input first feature 112. The parameters of this output layer can also be learned through a training process, as will be described below.

In some implementations where the candidate information 122 includes a bounding box, this bounding box can be directly used to define a candidate face region 104 in the image 102. If the candidate information 122 includes positions of facial landmarks, at the region identification stage 130, the positions of facial landmarks are used to align with facial landmarks contained in the image 102. If aligned facial landmarks are found, a region with a predefined size around the aligned facial landmarks is recognized as the candidate face region 104.

In order to deal with large pose variations of possible faces in the image 102, in some implementations, at the region identification stage 130, a geometric transformation on the positions of facial landmarks can be used to normalize a face pattern in the candidate face region 104. For example, the region identification stage 130 may act as a transformer stage to transform the positions of facial landmarks to canonical positions. These canonical positions define one or more normalized face poses, such as a front face or any other suitable face pose. Hence, transformation towards the canonical positions would be helpful to eliminate variations of scale and rotation.

In some implementations, the transformation can be done based on a predefined mapping between the positions of facial landmarks and the canonical positions, which can be represented as follows:

$$\begin{bmatrix} \bar{x}_i - m_{\bar{x}} \\ \bar{y}_i - m_{\bar{y}} \end{bmatrix} = \begin{bmatrix} a & b \\ -b & a \end{bmatrix} \begin{bmatrix} x_i - m_x \\ y_i - m_y \end{bmatrix} \quad (1)$$

where $x_i$, and $y_i$, represent coordinates of a detected position of a facial landmark in a two-dimensional space of the input image 102, and $\bar{x}_i$ and $\bar{y}_i$ represent coordinates of a corresponding canonical position in the same space, $m_*$ represents a mean value of the corresponding variables, for example, $$m_x = \frac{1}{N} \sum x_i$$

with N being the number of facial landmarks in a face, and a and b represent the mapping parameters for the positions of facial landmarks and the canonical positions. Such mapping can be obtained through a training process with supervised information, as will be described below.

Then, the candidate face region 104 can be identified based on the canonical positions. To this end, the image 102 may be rotated and/or scaled so that the transformed canonical positions are aligned with some possible points of facial landmarks in the image 102. In response to finding the aligned positions, a region with a predefined size around the aligned positions is located and identified as the candidate face region 104.

Figure 2:
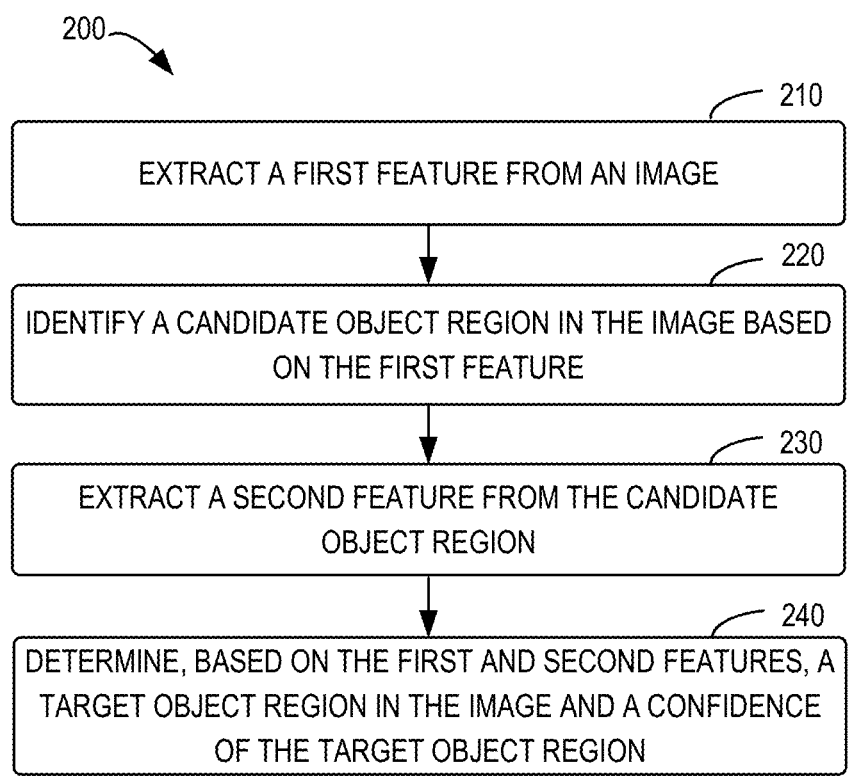
FIG. 2 illustrates a flow chart of a method of object detection in accordance with an implementation of the subject matter described herein.

Still referring to FIG. 2, at 230, the second feature 142 is extracted from the candidate object region (for example, the candidate face region) 104 by the second feature extraction stage 140. Similar to the first feature extraction stage 110, the second feature extraction stage 140 may also be constructed as a neural network such as a CNN for feature extraction, which is obtained through a training process, for example. The configuration of the CNN (such as the number and arrangements of layers and neurons) in the second feature extraction stage 140 may or may not be the same as that of the CNN in the first feature extraction stage 110.

At 240, based on the first and second features 112 and 142, a target object region in the image 102 and a confidence for the target object region are determined by the final output stage 150. In the examples of face detections, the target object region is a face region. Specifically, if there are two or more first features 112 extracted from the image 102 in the first feature extraction 110, at 240, each of the first features can be used to determine a target face region.

A target face region may be represented by its location. In some implementations, similar to the location of the candidate face region 104, the location of the target face region may include positions of facial landmarks in the target face region and/or a bounding box. The confidence for the target face region indicates the probability of containing a true face in that target face region.

In some implementations, the final output stage 150 may obtain the target face region by adjusting the location of the candidate face region 104. Alternatively, in other implementations, the final output stage 150 may retain the location of the candidate face region 104 and produce the confidence to indicate the accuracy. For example, if the final output stage 150 determines that no face is actually contained in the candidate face region 104, a confidence with a predefined value (for example, zero) may be generated.

In some implementations, similar to the candidate output stage 120, the final output stage 150 can be constructed as a CNN output layer including a plurality of CNN neurons. This output layer may be a fully connected output layer with each of the neurons connected to all the values included in the first and second features 112 and 142. The parameters of the output layer may be learned through a training process as will be described below.

Figure 3A:
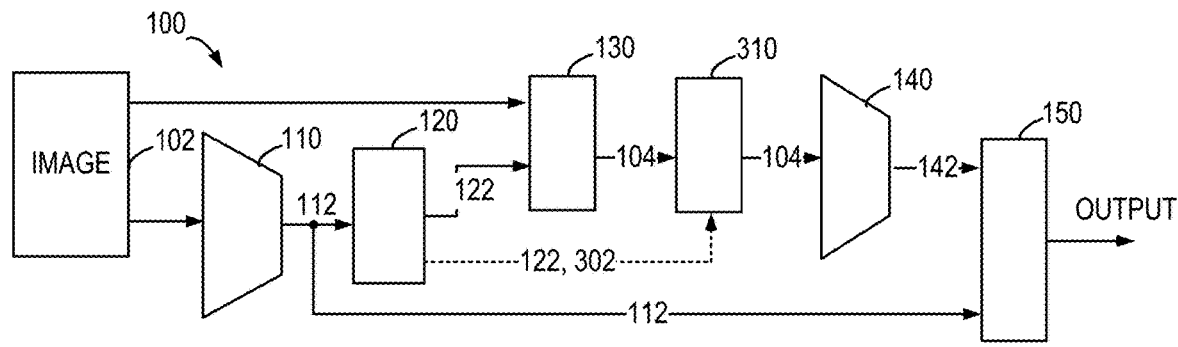
FIG. 3A illustrates a block diagram of a system for object detection in accordance with another implementation of the subject matter described herein.

As described above, the first feature extraction stage 110 performs coarse feature extraction for the whole input image 102. As such, a relatively large number of first features 112 can be extracted, which means that a large number of different candidate face regions 104 may be identified and processed in the following stages. In order to reduce the computation complexity and improve efficiency, in some implementations, some of the candidate face regions 104 may be discarded. To this end, an additional region rejection stage 310 may be added in the system 100 of FIG. 1. FIG. 3A shows such an implementation of the system 100. As shown, the region rejection stage 310 is located between the region identification stage 130 and the second feature extraction stage 140 and configured to determine which candidate face region 104 is to be rejected or accepted for further processing.

In some implementations, a non-maximum suppression (NMS) based approach is used in the region rejection stage 310 to reject the number of candidate face regions for further processing. In operation, the region rejection stage 310 receives candidate face regions 104 from the region identification stage 130, determines whether the candidate face regions 104 is overlapped by any candidate face region that have been received before, and discards those overlapped regions 104. In this way, only the non-overlapped candidate face regions 104 in the image 102 are provided to the second feature extraction stage 140.

On the other hand, it has also been found that some non-overlapped candidate face regions 104 just contain background pixels, while those potential face regions might be incorrectly rejected. In addition, since only one candidate face region 104 is preserved for a potential face by following the non-overlapping rule, it is possible that the subsequent stages fail to detect the face due to the limited number of regions provided. In order to avoid these situations, in some implementations, a candidate face region can be also assigned with a confidence, and the region rejection stage 310 may decide whether to discard a candidate face region 104 based on the confidence.

In these implementations, the candidate output stage 120 determines a confidence 302 for a candidate face region based on the received first features 112. That is, the candidate output stage 120 is a multi-task stage which outputs not only the location of a candidate face region but also its confidence. The confidence 302 indicates a probability of containing a true face in that candidate face region. It will be appreciated that although the accuracy of such a confidence might be relatively low, it would be useful for the region rejection.

Based on the received confidences 302 for candidate face regions 104 from the candidate output stage 120, in some implementations, the region rejection stage 310 may preserve a number of candidate face regions 104 with high confidences for one potential face and reject other candidate face regions 104 that are corresponding to this candidate face. For example, the region rejection stage 310 selects the candidate face regions 104 with confidences 302 exceeding a threshold or with the highest confidences 302. The number preserved for each potential face may be predetermined, such as 3, 5, 7, or the like. In some implementations, an upper limit for the total number of preserved candidate face regions 104 can be defined in advance. In this way, the candidate face regions 104 with high confidences of including potential faces may be retained for processing in the second feature extraction stage 140.

The region rejection stage 310 is further able to determine whether a candidate face region 104 and another candidate face region(s) 104 are corresponding to the same candidate face based on their locations (which are also provided by the candidate output stage 120 as the candidate information 122). For example, the region rejection stage 310 determines the difference between given locations of two candidate face regions 104. The given location may be a center of a bounding box for a candidate face region 104, and/or a position of a facial landmark, for example. If the difference is low (for example, lower than a threshold), then the region rejection stage 310 determines that these two candidate face regions 104 may include the same face.

Alternatively, or in addition, in other implementations, the candidate face regions 104 with low confidences may be early rejected before they are identified by the region identification stage 130. Specifically, it is possible to reject the candidate information 122 corresponding to the candidate face regions 104 that are not intended to be preserved and to provide the region identification stage 130 with the remaining candidate information 122.

Figure 3B:
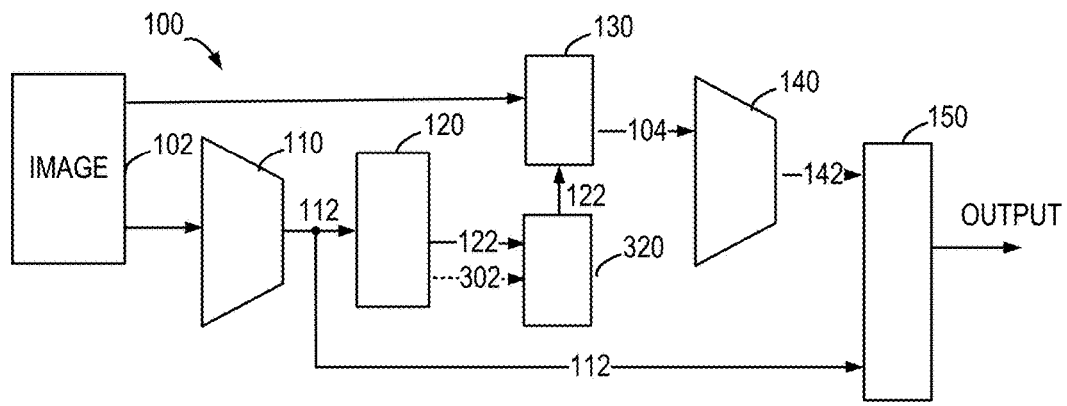
FIG. 3B illustrates a block diagram of a system for object detection in accordance with a further implementation of the subject matter described herein.

FIG. 3B shows such an implementation of the system 100 with an information rejection stage 320. As shown, the rejection stage 320 is arranged between the candidate output stage 120 and the region identification stage 130. The information rejection stage 320 applies similar approaches as the region rejection stage 310 to decide whether to forward the candidate information 122 to the region identification stage 130 or not. In such implementation, the information rejection stage 320 receives the candidate information 122 and possibly the confidences 302 for candidate face regions 104 from the candidate output stage 120.

In some cases of using the NMS based approach, the information rejection stage 320 first determines whether two candidate face regions are to be overlapped based on the locations of candidate face regions 104 in the information 122 (the locations of bounding boxes or the positions of facial landmarks) and then forward candidate information 122 that is corresponding to non-overlapped candidate face regions 104 only. Alternatively, or in addition, the information rejection stage 320 receives the confidences 302, and decide to provide the candidate information 122 for candidate face regions 104 having high confidences 302 for each potential face. Since less candidate information 122 is received, the computation complexity at the region identification stage 130 as well as the following stage is reduced.

Figure 4:
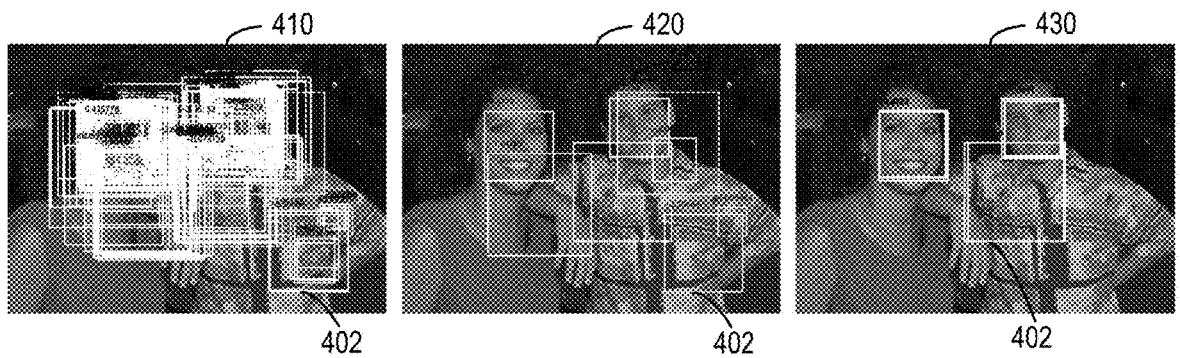
FIG. 4 illustrates a comparison of implementations with and without region rejection in accordance with an implementation of the subject matter described herein.

FIG. 4 shows a comparison of implementations with and without region/information rejection. It is shown in an image 410 that a large number of candidate face regions (marked by bounding boxes 402) are identified based on the first features extracted by the first feature extraction stage 110. Processing all of those candidate face regions may ensure that the faces included in the image 410 are detected. However, the efficiency would probably be low.

If the candidate face regions in the image 410 are reduced using the NMS based approach, as shown in the image 420, only a predetermined number of non-overlapped candidate face regions (marked by bounding boxes 402) are remained, which may significantly reduce the complexity for the subsequent processing. However, most of the preserved regions in the image 420 only include background pixels. This is not desirable because their detection results may be verified as negative in the subsequent processing. By rejecting the candidate face regions or candidate information based on the confidences, a plurality of candidate face regions (marked by bounding boxes 402) that correspond to the potential faces are preserved in an image 430, while most of the background regions can be discarded.

In the implementations discussed above, the region rejection or information rejection may help decrease the computation complexity by reducing the number of candidate face regions. In the cases where the CNN is applied in the feature extraction stage 110, the convolutional layers are computationally expensive. It sometimes takes up about 90% of the time in runtime for an input image. To further improve the overall efficiency of the system 100, the computational complexity and time consumption of convolution layers in the CNNs may be reduced. In some implementations, it is desired to only process the regions of interest (ROIs) and ignore other regions within the first feature extraction stage 110 by masking the input image 102 with a mask.

Figure 5:
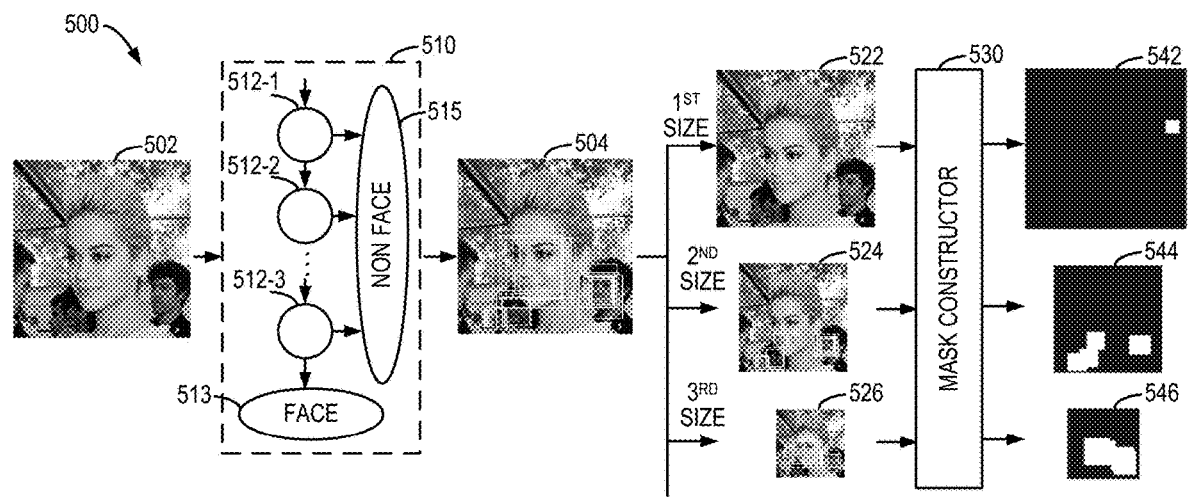
FIG. 5 illustrates a block diagram of a system for mask construction in accordance with an implementation of the subject matter described herein.

To construct the mask, in some implementations, a simple region detector approach is first applied to detect face regions in the input image 102 and then a mask can be constructed based on the detected face regions. This detector may perform face detection in a simple and fast way to provide coarse classification results of face and non-face regions. FIG. 5 shows an example system 500 for mask construction.

As shown, the system 500 includes a detector 510 for detecting face regions and a mask constructor 530 for constructing a mask. The detector 510 includes a plurality of cascade classifiers, such as classifiers 512-1, 512-2, and 512-3 (collectively or individually referred to as 512). After obtaining an input image 502 (which is an example of the input image 102 of the system 100), various patches with a predefined size can be identified in the image 502 and processed by the classifiers 512 in the detector 510. In some examples, the detector 510 may slide a window with the predefined size in the area of the image 502 to identify the patches.

Each classifier 512 in the detector 510 determines whether it is true or false that a patch can be identified as a candidate face. If false, the patch is thrown into a pool of non-face regions 515. If the classifier 512 determines that the patch is identified as a candidate face, this path is passed to a next classifier for further verification. When all the classifiers 512 determine that the patch is a candidate face, this patch may be put into a pool of face region 513. All the identified patches are classified in either the pool of non-face region 515 or the pool of face region 513. In some examples, more than one patch may be put in the pool 513.

In some examples, a classifier 512 in the detector 510 may be a boosted classifier which includes a plurality of week classifiers. A week classifier may be implemented by a conventional boosted fern each includes a plurality of binary nodes to make the decisions for the classifiers. For a fern, the function of splitting the patch into a pool of face region or a pool of non-face region may be implemented by comparing a difference between values of two pixels in two different locations of the patch with a threshold. If the difference is higher than a threshold, a positive result is obtained by the fern. Otherwise, a negative result may be obtained.

The splitting function of the i-th fern in a week classifier included in a classifier 512 may be represented as follows.

$$s_i = \begin{cases} 1, & p(x_{1_i}, y_{1_i}) - p(x_{2_i}, y_{2_i}) < \theta_i \\ 0, & \text{otherwise} \end{cases} \quad (2)$$

where $s_i$ represents the result of the i-th fern, p represents the p-th patch, $p(x_{1_i}, y_{1_i})$ represents a value of a pixel at a position in the patch defined by two-dimensional coordinates $x_{1_i}$ and $y_{1_i}$ and $p(x_{2_i}, y_{2_i})$ represents a value of another pixel at a position in the patch defined by coordinates $x_{2_i}$ and $y_{2_i}$ and $\theta_i$ represents a threshold for the difference of pixel values. $x_{1_i}, y_{1_i}, x_{2_i}, y_{2_i},$ and $\theta_i$ are parameters for the fern, which may be learned from a set of training samples (or image patches).

Each of the ferns included in a week classifier splits the data space of the patch into one of a plurality of partitions. For example, if eight ferns are included, the data space may be split into $2^8$=256 partitions. The result of a week classifier is determined based on the results of the ferns included therein while the result of a boosted classifier 512 in the detector 510 is determined based on the results of week classifiers included therein. In some implementations, to learn the parameters for a fern (such as $x_{1_i}, y_{1_i}, x_{2_i}, y_{2_i},$ and $\theta_i$), a Real-Boost approach may be applied.

Although an example classifier 512 is described above, it is to be understood that any other kinds of classifier may be used in the detector 510 to classify face and non-face regions. It is also to be understood that the detector 510 may be implemented in a variety of ways to detect face regions from the input image 502.

In some implementations, if one or more patches in the image 502 are identified to be potential face regions, the detector 510 marks the patch or patches in the image 502. Since the patches are identified as having the same predefined size, it means that only some faces whose sizes match with that predefined size are marked in those patches, but those with larger or smaller sizes may not be detected. Generally speaking, the faces contained in an image may have different sizes. In order to mark small face regions, in some implementations, the predefined size may be set as relatively small. To further detect face with larger sizes, the image 502 may be downsampled to a smaller size, and the detector 510 may perform the same region classification on the downsampled image using the same small patch size. Therefore, although the size used to identify patches remains the same, a larger face size in the image 502 can be identified because of the downsampling.

In some examples, the detector 510 may downsample the image 502 with a predefined sampling rate. For example, the predefined sampling rate may be a 2× rate so that the resolution of the downsampled image is a half of the resolution of the original image 502. Therefore, face regions that are twice as larger as the size of patches can be detected from the image 502. It would be appreciated that other sampling rate, such as 1.5×, 2.5×, 3× or the like, may also be applied in some examples.

The detector 510 may perform several times of downsampling on the image 502 so as to mark patches that cover different sizes of face regions in the image 502. In some examples, the detector 510 may keep downsampling the image 502 until the downsampled image has a small size (for example, below a threshold). As shown in FIG. 5, after classification by the detector 510, the patches that are identified as candidate faces and have different sizes are marked in the image 504. In some implementations, patches are grouped according to their sizes in order to construct the mask. For example, the patches in the image 504 that have the predefined size (referred to the first size) may be grouped and shown in an image 522. Those patches identified from the image that are downsampled from the original image 502 with a larger size (referred to the second size) in the image 504 may be grouped and shown in a downsampled image 524. Likewise, a downsampled image 526 has patches marked with a larger third size.

The mask constructor 530 constructs a mask by binarizing values of pixels in an image based on the patch or patches that are marked as face regions in that image. For example, different values may be set to pixels within all the marked patch (or patches) and pixels outside the marked patch (patches). In one example, pixels within a marked patch are set as one while pixels outsides that patch are set as zero in the mask. The different values within and outside the marked patch indicate that different operations may be performed on those regions. In some other examples, other different values may also be set to pixels within and outside the patch.

In some implementations, in order to retain some background information, the mask constructor 530 increases the size of a marked patch to generate an enlarged patch. Accordingly, the mask can be constructed by binarizing values of pixels in the image based on the enlarged patch. For example, a size of a marked patch may be doubled or may be multiplied by other values.

In the example as shown in FIG. 5, based on the patches marked in the image 522, the mask constructor 530 constructs a first mask 542 with a size that is the same as the image 522 (which may also be the same as the input image 502) by binarizing values of pixels in the image 522. Likewise, the mask constructor 530 constructs a further mask (referred to a second mask) for the downsampled image (such as the downsampled images 544 and 546) in a similar manner. The mask 544 constructed for the downsampled image 524 has the same size as the downsampled image 524 while the mask 546 has the same size as the downsampled image 526. It would be appreciated that although three masks are constructed in the system 500, a larger or smaller number of masks (for example, 1, 2, 4, 5, or even 10 masks) may be provided for the input image.

One or more masks generated by the mask construction system 500 may be used to mask the input image at the first feature extraction stage 110. In some implementations, the size of the input image 102 is adjusted to match with the size of the used mask. For example, if the mask has the original size of the input image 102, the input image 102 can remain unchanged. If the mask created from the downsampled is provided, the image 102 is downsampled to the size of the downsampled mask. After the masking, the patches marked as a candidate face region are processed by the first feature extraction stage 110, while other regions are skipped. In this way, it is possible to significantly reduce the computation cost, especially the cost in the convolutional layers in the CNN of the stage 110. It would be appreciated that when the input image 102 is downsampled to match with the size of a mask, the same downsampled image is provided to the region identification stage 130 in the system 100.

Figure 6:
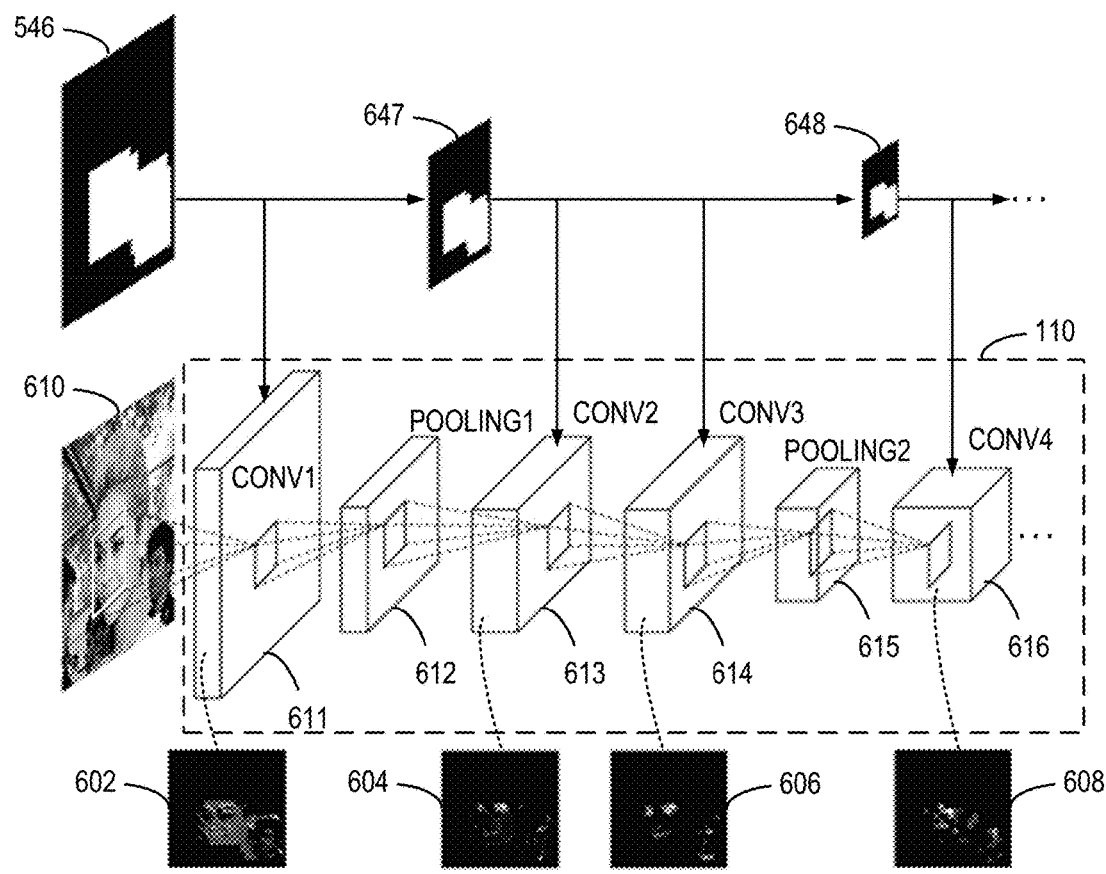
FIG. 6 illustrates a schematic diagram of image masking in a first feature extraction stage in the system of FIG. 1 in accordance with an implementation of the subject matter described herein.

FIG. 6 shows an example of image masking in the first feature extraction stage 110. As shown, the first feature extraction stage 110 is implemented as a CNN with a plurality of convolutional layers Conv1 611, Conv2 613, Conv3 614, and Conv4 616. Two pooling layers Pooling1

612 and Pooling2 615 are disposed between the convolutional layers 611 and 613 and between the convolutional layers 614 and 616, respectively. It would be appreciated that the construction of the first feature extraction stage 110 is merely shown in FIG. 6 as an example. In other examples, more or less layers or other types of layers may be included and the arrangements of the layers may be different.

During the operation of the CNN, an image is downsampled after processed by a pooling layer (for example, with a sampling rate of 2×). In the example shown in FIG. 6, the mask 546 and the image 610 (which is downsampled from the image 502 to the same size of the mask 546) are input into the first convolutional layer 611. After masked by the mask 546, the convolutional layer 611 processes the region that is indicated to be processed in the mask (for example, the region with pixel values set as one) while skip other regions. As shown, the convolutional layer 611 processes the region 602, instead of the whole input image 610.

Since the image 610 is downsampled after the pooling layer 612, the mask 546 is also be downsampled to be a mask 647 which has the same size of the image processed in this layer. The mask 647 is provided into the convolutional layer 613 to mask the image in this layer. The mask 647 is also input to the convolutional layer 614 for image masking since no pooling layer is disposed between the two convolutional layers 613 and 614. Therefore, only the masked images 604 and 606 are processed instead of their whole input images. Likewise, the mask 647 is downsampled to a mask 648 to be provided into the convolutional layer 616 after the pooling layer 615 and thus the masked image 608 is processed in the layer 616.

In addition to skipping the non-face regions, constructing masks with sizes of the downsampled images also allows the first feature extraction stage 110 to process a large face region in a small resolution. For example, if there is a face filling almost the whole image 102, after the downsampling and masking, the first feature extraction stage 110 does not necessarily have to process the full size image 102. Instead, processing can be applied on the downsampled small image, thereby reducing the computation cost.

Compared with some conventional convolutions in the CNN, the masking approach described above may further reduce the computation cost. For example, a conventional approach is to transform the convolution operations into a matrix multiplication. This is done by reshaping a filter tensor into a matrix F with dimensions $CK^2 \times N$, where C and N are the numbers of input and output channels of the convolutional layer, and K is the filter width/height in the layer. A data matrix is then collected by duplicating the original data in the input image into a matrix D with dimensions $WH \times CK^2$, where W and H are output width and height of the convolutional layer. The computations of the layer are performed with a single matrix multiplication to form an output matrix O=DF with dimension $WH \times N$.

With the image masking, the convolutions are performed on patches marked as face regions in the input image. Thus, only the marked patches are duplicated. The input data is duplicated as a matrix D' with dimensions $M \times CK^2$, where M is the number of entries in the marked patch. After matrix multiplication, the output may be obtained as O'=D'F with dimension $M \times CK^2$. The computation complexity of convolutions in the masking approach is $MCK^2N$. Therefore, the computation cost is linearly decreased according to the sparsity provided by the mask.

Although there are multiple masks and several times of downsampling in the implementations described above, these are merely for the purpose of illustration without suggesting any limitations as to the scope of the subject matter described herein. In other implementations, the detector 510 may generate a single mask for the image with the original size, without downsampling the input image 102. Alternatively, the detector 510 may provide one or more downsampled masks without providing the mask with the original size.

Now some implementations for training the parameters used in the various stages in the system 100 will be described. For ease of discussion, in the following discussions, it is assumed that the system 100 work on the basis of a CNN. As described above, a plurality of training images may be used in training of one or more stages in the system 100, such as the first and second feature stages 110 and 140, the candidate output stage 120, the region identification stage 130, and the final output stage 150. As shown in FIG. 1, those stages are connected in a cascade structure. In some implementations, those stages are obtained through end-to-end training with supervised information. The supervised information may be applied for both the candidate output stage 120 and the final output stage 150.

For example, for the first and second feature stages 110 and 140, a joint optimization objective may be constructed. Such optimization objective can be represented by a joint objective function, for example. Then the parameters for the first and second feature stages 110 and 140, such as the weights for the neurons in the CNNs in these stages, may be obtained from a set of training images. The training images have the locations of face regions identified therein and associated with the confidences of the face regions. In some examples, the training images also include some negative samples where non face regions are included. The training continues until the parameters enable the first and second feature stages 110 and 140 to extract features from the input training images that can provide approximately correct outputs (output by the candidate output stage 120 and the final output stage 150).

In some implementations, a first objective function is constructed for the first feature extraction stage 110. The first objective function ensures that the first features extracted in this stage enables the candidate output stage 120 to output locations of face regions and confidences of the face regions in the training images. Likewise, a second objective function is constructed for the second feature extraction stage 140. Various approaches for constructing an objective function for a neural network may be used in implementations of the subject matter. The joint function is based on the first and second objective functions to jointly learn parameters for the stages. For example, the joint function may be a weighted sum of the first and second objective function.

In some implementations, the parameters are iteratively updated during the training process until convergence of the objective function. In some implementations, gradient descent techniques and back propagation methods may be applied to determine and update the parameters. It would be appreciated that, to enable the first and second feature extraction stages 110 and 150 to learn parameters from the training images, the parameters for the candidate output stage 120 and the final output stage 150 are also be determined.

The mapping used to map the positions of facial landmarks to the canonical positions in the region identification stage 130 may also be determined in the training process with the same supervised information (for example, those training images with locations and confidence marked) as the stages 110, 120, 140, and 150. For example, if the mapping is represented as in the above Equation (1), an objective function may be constructed in various manners so as to determine and update the parameters a and b. Different from the conventional approaches where the canonical positions are manually marked, the canonical positions in implementations of the subject matter described herein are learned in the training process. That is, no supervised information related to the canonical positions is provided in the training images. The canonical positions may be initialized as random positions and updated as the parameters a and b update. In this way, it is possible to avoid human interventions which are error prone and time-consuming. Moreover, the training process may also make sure that the resulting canonical positions are always desirable no matter how the canonical positions are initialized.

Figure 7:
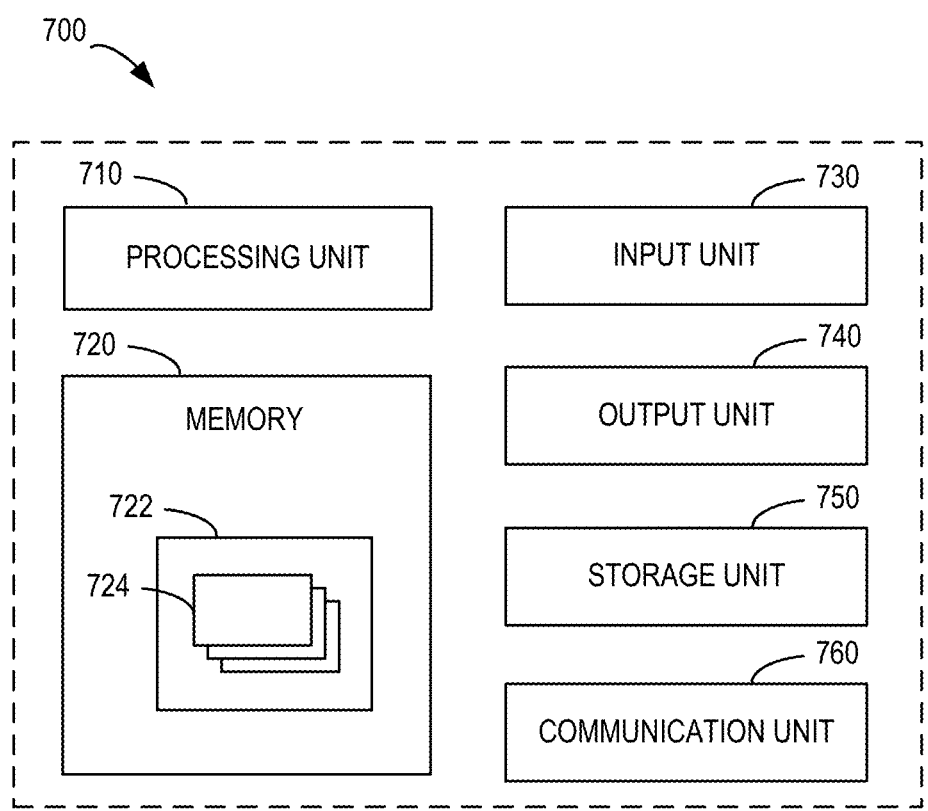
FIG. 7 illustrates a block diagram of an example computing system/server in which one or more implementations of the subject matter described herein may be implemented.

FIG. 7 shows a block diagram of an example computing system/server 700 in which one or more implementations of the subject matter described herein may be implemented. The system 100 of FIGS. 1, 3A, and 3B and/or the system 500 of FIG. 5 may be implemented by one or more computing systems/servers 700. The computing system/server 700 as shown in FIG. 7 is only an example, which should not be constructed as any limitation to the function and scope of use of the implementations of the subject matter described herein.

As shown in FIG. 7, the computing system/server 700 is in a form of a general-purpose computing device. Components of the computing system/server 700 may include, but are not limited to, one or more processors or processing units 710, a memory 720, one or more input devices 730, one or more output devices 740, storage 750, and one or more communication units 760. The processing unit 710 may be a real or a virtual processor and is capable of performing various processes in accordance with a program stored in the memory 720. In a multi-processing system, multiple processing units execute computer-executable instructions to increase processing power.

The computing system/server 700 typically includes a variety of machine readable medium. Such medium may be any available medium that is accessible by the computing system/server 700, including volatile and non-volatile medium, removable and non-removable medium. The memory 720 may be volatile memory (e.g., registers, cache, a random-access memory (RAM)), non-volatile memory (e.g., a read only memory (ROM), an electrically erasable programmable read only memory (EEPROM), a flash memory), or some combination thereof. The storage 750 may be removable or non-removable, and may include machine readable medium such as flash drives, magnetic disks or any other medium which can be used to store information and which can be accessed within the computing system/server 700.

The computing system/server 700 may further include other removable/non-removable, volatile/non-volatile computing system storage medium. Although not shown in FIG. 7, a disk driver for reading from or writing to a removable, non-volatile disk (e.g., a "floppy disk"), and an optical disk driver for reading from or writing to a removable, non-volatile optical disk can be provided. In these cases, each driver can be connected to the bus by one or more data medium interfaces. The memory 720 may include at least one program product having a set (e.g., at least one) of program modules that are configured to carry out the functions of various implementations of the subject matter described herein.

A program/utility tool 722 having a set (at least one) of the program modules 724 may be stored in, for example, the memory 720. Such program modules 724 include, but are not limited to, an operating system, one or more applications, other program modules, and program data. Each or a certain combination of these examples may include an implementation of a networking environment. The program modules 724 generally carry out the functions and/or methodologies of implementations of the subject matter described herein, for example, the method 200.

The input unit(s) 730 may be one or more of various different input devices. For example, the input unit(s) 730 may include a user device such as a mouse, keyboard, trackball, etc. The input unit(s) 730 may implement one or more natural user interface techniques, such as speech recognition or touch and stylus recognition. As other examples, the input unit(s) 730 may include a scanning device, a network adapter, or another device that provides input to the computing system/server 700. The output unit(s) 740 may be a display, printer, speaker, network adapter, or another device that provides output from the computing system/server 700. The input unit(s) 730 and output unit(s) 740 may be incorporated in a single system or device, such as a touch screen or a virtual reality system.

The communication unit(s) 760 enables communication over communication medium to another computing entity. Additionally, functionality of the components of the computing system/server 700 may be implemented in a single computing machine or in multiple computing machines that are able to communicate over communication connections. Thus, the computing system/server 700 may operate in a networked environment using logical connections to one or more other servers, network personal computers (PCs), or another common network node. By way of example, and not limitation, communication media include wired or wireless networking techniques.

The computing system/server 700 may also communicate, as required, with one or more external devices (not shown) such as a storage device, a display device, and the like, one or more devices that enable a user to interact with the computing system/server 700, and/or any device (e.g., network card, a modem, etc.) that enables the computing system/server 700 to communicate with one or more other computing devices. Such communication may be performed via an input/output (I/O) interface(s) (not shown).

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some implementations of the subject matter described herein are listed below.

In some implementations, a computer-implemented method is provided. The method comprises extracting a first feature from an image; identifying a candidate object region in the image based on the first feature; extracting a second feature from the candidate object region; and determining, based on the first and second features, a target object region in the image and a confidence for the target object region.

In some implementations, the candidate object region includes a candidate face region, and the identifying the candidate object region comprises detecting positions of facial landmarks based on the first feature; and identifying the candidate face region in the image based on the positions of facial landmarks.

In some implementations, identifying the candidate face region in the image based on the positions of facial landmarks comprises mapping the positions of facial landmarks to canonical positions based on a predefined mapping; and identifying the candidate face region in the image based on the canonical positions.

In some implementations, extracting the second feature comprises determining a confidence for the candidate object region based on the first feature; determining whether to process the candidate object region or not based on the determined confidence; and in response to determining to process the candidate object region, extracting the second feature from the candidate object region.

In some implementations, extracting the first feature comprises identifying patches with a predefined size in the image; constructing a first mask by binarizing values of pixels in the image based on one of the patches that is identified as a candidate object; masking the image with the first mask; and extracting the first feature from the masked image.

In some implementations, constructing the first mask comprises generating an enlarged patch by increasing the predefined size of the patch; and constructing the first mask by binarizing values of pixels in the image based on the enlarged patch.

In some implementations, extracting the first feature comprises downsampling the image with a predefined sampling rate; identifying patches with a predefined size in the downsampled image; constructing a second mask by binarizing values of pixels in the downsampled image based on one of the patches that is identified as a candidate object; masking the downsampled image with the second mask; and extracting the first feature from the masked downsampled image.

In some implementations, the first feature is extracted by a first process and the second feature is extracted by a second process, and the first and second processes are trained based on a joint optimization objective.

In some implementations, at least one of the first and second features is extracted based on a convolutional neural network (CNN).

In some implementations, a device is provided. The device comprises a processing unit; a memory coupled to the processing unit and storing instructions thereon, the instructions, when executed by the processing unit, causing the device to: extract a first feature from an image; identify a candidate object region in the image based on the first feature; extract a second feature from the candidate object region; and determine, based on the first and second features, a target object region in the image and a confidence for the target object region.

In some implementations, the candidate object region includes a candidate face region, and the instructions, when executed by the processing unit, further cause the device to identify the candidate object region by: detecting positions of facial landmarks based on the first feature; and identifying the candidate face region in the image based on the positions of facial landmarks.

In some implementations, the instructions, when executed by the processing unit, further cause the device to identify the candidate face region in the image based on the positions of facial landmarks by: mapping the positions of facial landmarks to canonical positions based on a predefined mapping; and identifying the candidate face region in the image based on the canonical positions.

In some implementations, the instructions, when executed by the processing unit, further cause the device to extract the second feature comprises by: determining a confidence for the candidate object region based on the first feature; determining whether to process the candidate object region or not based on the determined confidence; and in response to determining to process the candidate object region, extracting the second feature from the candidate object region.

In some implementations, the instructions, when executed by the processing unit, further cause the device to extract the first feature by: identifying patches with a predefined size in the image; constructing a first mask by binarizing values of pixels in the image based on one of the patches that is identified as a candidate object; masking the image with the first mask; and extracting the first feature from the masked image.

In some implementations, the instructions, when executed by the processing unit, further cause the device to construct the first mask by: generating an enlarged patch by increasing the predefined size of the patch; and constructing the first mask by binarizing values of pixels in the image based on the enlarged patch.

In some implementations, the instructions, when executed by the processing unit, further cause the device to extract the first feature by: downsampling the image with a predefined sampling rate; identifying patches with a predefined size in the downsampled image; constructing a second mask by binarizing values of pixels in the downsampled image based on one of the patches that is identified as a candidate object; masking the downsampled image with the second mask; and extracting the first feature from the masked downsampled image.

In some implementations, the first feature is extracted by a first process and the second feature is extracted by a second process, and the first and second processes are trained based on a joint optimization objective.

In some implementations, at least one of the first and second features is extracted based on a convolutional neural network (CNN).

In some implementations, a computer program product is provided. The computer program product is tangibly stored on a machine-readable medium and comprising machine-executable instructions, the instructions, when executed on at least one processor of a device, causing the device to: extract a first feature from an image; identify a candidate object region in the image based on the first feature; extract a second feature from the candidate object region; and determine, based on the first and second features, a target object region in the image and a confidence for the target object region.

In some implementations, the candidate object region includes a candidate face region, and the instructions, when executed by the processing unit, further cause the device to detect positions of facial landmarks based on the first feature and identify the candidate face region in the image based on the positions of facial landmarks.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:

1. A computer-implemented method comprising: performing, by at least one processor, a first extraction stage comprising:
   extracting a first feature from an image of a whole scale, wherein the first feature characterizes information about context of the image with numeric values, and
   identifying one or more candidate face regions of the image based on the extracted first feature;
   performing a second extraction stage comprising extracting a second feature from the identified one or more candidate face regions, wherein the second feature characterizes information in a local scale, which is at the same scale as the whole scale, of the image with numeric values, comprises normalized face poses, and provides details of a rotation or scale variation inside the identified one or more candidate face regions;
   performing a joint feature stage comprising:
      obtaining the first feature, obtaining the second feature, and
      identifying at least one face region of the image based on the obtained first feature and the obtained second feature.

2. The method of claim 1, wherein the joint feature stage further comprises:
   determining a confidence of the identified at least one face region based on the obtained first feature and the obtained second feature.

3. The method of claim 1, wherein the identifying the one or more candidate face regions identifies a plurality of candidate face regions of the image based on the extracted first feature.

4. The method of claim 1, further comprising:
   transforming positions of facial landmarks to canonical positions, wherein the canonical positions are used to normalize face poses.

5. The method of claim 1, wherein the second feature is extracted from a plurality of candidate face regions.

6. The method of claim 1, wherein the performing a first extraction stage further comprises:
   extracting another first feature from the image of the whole scale, wherein the another first feature characterizes information of the image with numeric values, and
   identifying one or more candidate face regions of the image based on the extracted another first feature.

7. The method of claim 6, wherein the performing the joint feature stage further comprises:
   obtaining the another first feature, and
   identifying at least one face region of the image based on the obtained first feature, the obtained another first feature, and the obtained second feature.

8. The method of claim 1, wherein extracting the first feature comprises:
   identifying a set of patches with a predefined size in the image;
   constructing a first mask by binarizing values of pixels in the image based on a first patch in the set of patches, wherein the first patch is identified as a candidate object;
   masking the image with the first mask; and
   extracting the first feature from the masked image.

9. The method of claim 8, wherein constructing the first mask further comprises:
   generating an enlarged patch by increasing the predefined size of the first patch of the set of patch; and
   constructing the first mask by binarizing values of pixels in the image based on the enlarged patch.

10. The method of claim 8, wherein extracting the first feature from the masked image further comprises:
    downsampling the image of the whole scale with a predefined sampling rate;
    identifying a new set of patches with a defined size in the downsampled image;
    constructing a second mask by binarizing values of pixels in the downsampled image based on a second patch in the new set of patches that is identified as a candidate object in the downsampled image;
    masking the downsampled image with the second mask; and
    extracting the first feature from the masked downsampled image.

11. The method of claim 8, wherein the first feature is extracted by a first process and the at least one second feature is extracted by a second process, and the first and second processes are different.

12. A device comprising:
    a processing unit;
    a memory coupled to the processing unit and storing instructions thereon, the instructions, when executed by the processing unit, causing the device to:
    perform a first extraction stage comprising:

extracting a first feature from an image of a whole scale, wherein the first feature characterizes information about context of the image with numeric values, and identifying one or more candidate face regions of the image based on the extracted first feature;

perform a second extraction stage comprising extracting a second feature from the identified one or more candidate face regions using a second objective function, wherein the second feature characterizes information in a local scale, which is at the same scale as the whole scale, of the image with numeric values, comprises normalized face poses, and provides details of a rotation or scale variation inside the identified one or more candidate face regions;

perform a joint feature stage comprising:
obtaining the first feature,
obtaining the second feature, and
identifying at least one face region of the image based on the obtained first feature and the obtained second feature.

13. The device of claim 12, wherein the joint feature stage further comprises:
determining a confidence of the identified at least one face region based on the obtained first feature and the obtained second feature.

14. The device of claim 12, wherein the identifying the one or more candidate face regions identifies a plurality of candidate face regions of the image based on the extracted first feature.

15. The device of claim 12, wherein a totality of the one or more candidate face regions comprises less than the whole scale of the image.

16. The device of claim 12, wherein the second feature is extracted from a plurality of candidate face regions.

17. The device of claim 12, wherein the performing a first extraction stage further comprises:
extracting another first feature from the image of the whole scale, wherein the another first feature characterizes information of the image with numeric values, and
identifying one or more candidate face regions of the image based on the extracted another first feature.

18. The device of claim 17, wherein the performing the joint feature stage further comprises:
obtaining the another first feature, and
identifying at least one face region of the image based on the obtained first feature, the obtained another first feature, and the obtained second feature.

19. The device of claim 12, wherein extracting the first feature comprises:
downsampling the image with a predefined sampling rate;
identifying patches with a defined size in the downsampled image;
constructing a second mask by binarizing values of pixels in the downsampled image based on one of the patches that is identified as a candidate object;
masking the downsampled image with the second mask; and
extracting the first feature from the masked downsampled image.

20. A computer program product being tangibly stored on a machine-readable storage medium and comprising machine-executable instructions, the instructions, when executed on at least one processor of a device, causing the device to:

perform a first extraction stage comprising:
extracting a first feature from an image of a whole scale, wherein the first feature characterizes information about context of the image with numeric values, and
identifying candidate face regions of the image based on the extracted first feature, a totality of the identified candidate face regions comprising less than the whole scale using a first objective function;

perform a second extraction stage comprising extracting a second feature from a plurality of the identified candidate face regions using a second objective function, wherein the second feature characterizes information in a local scale, which is at the same scale as the whole scale, of the image with numeric values, comprises normalized face poses, and provides details of a rotation or scale variation inside the identified one or more candidate face regions;

perform a joint feature stage comprising:
obtaining the first feature,
obtaining the second feature, and
identifying at least one face region of the image based on the obtained first feature and the obtained second feature.

* * * * *